United States Patent Office 3,533,580
Patented Oct. 13, 1970

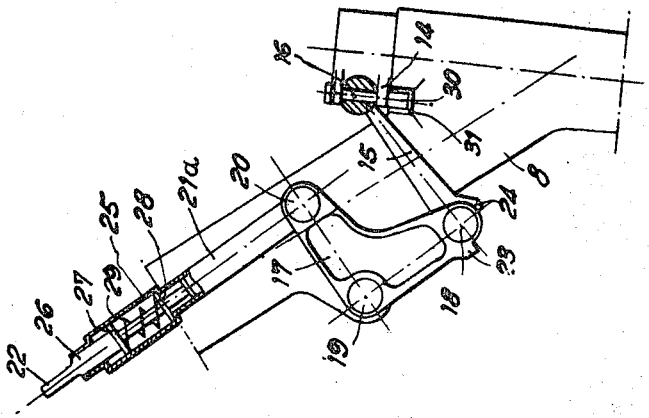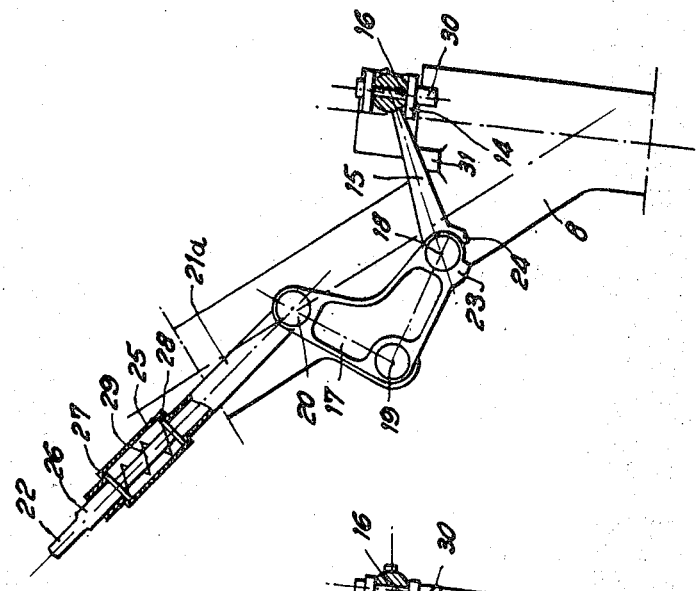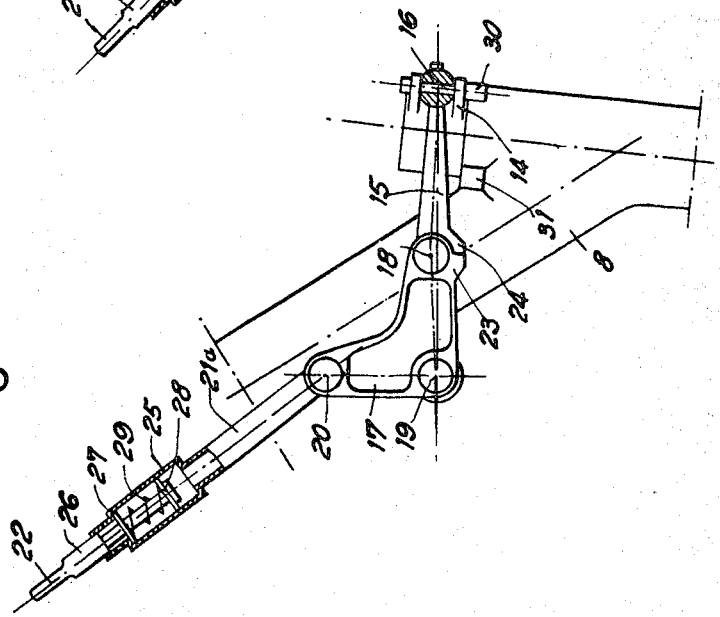

3,533,580
LIFTING SYSTEM OF FUSELAGE UNDER-CARRIAGES WITH RETRACTABLE WHEELS MOUNTED IN DIABOLO
Rene Lucien, Neuilly-sur-Seine, Hauts-de-Seine, France, assignor to Societe Anonyme dite: Messier, Paris, France
Filed Apr. 9, 1968, Ser. No. 719,893
Claims priority, application France, Apr. 11, 1967, 102,322
Int. Cl. B64c 25/12
U.S. Cl. 244—102                                                    7 Claims

ABSTRACT OF THE DISCLOSURE

Improvements in fuselage undercarriages with retractable wheels mounted in Diabolo of the kind disclosed in Pat. No. 3,357,659, in which the crank-arm coupling the crank-lever to the control lever of the pivotal shaft of the wheels is provided with an abutment which, in the down position of the undercarriage, comes into contact with an abutment on the corresponding portion of the crank-lever when the articulation of this crank-arm and the articulation of the crank-lever on the leg casing of the undercarriage have moved slightly beyond their position of alignment.

---

The present invention relates to improvements in the lifting system of fuselage undercarriages with retractable wheels mounted in Diabolo, which forms the subject of U.S. Pat. No. 3,357,659 of Dec. 12, 1967, in the name of the same applicant.

It will be recalled that the above-mentioned patent is concerned with a lifting system for a fuselage undercarriage with retractable wheels mounted in Diabolo, characterized in that the articulation hinge of the leg of the landing-gear of the aircraft is housed in the fuselage, and is inclined towards the ground and towards the plane of symmetry of the aircraft in the direction of the front of this latter, the moving system comprising the wheels and the shock-absorber being pivotally-mounted on the leg casing along an axis which, in the "undercarriage down" position, is parallel to the plane of symmetry of the aircraft, the lifting of the undercarriage being controlled by means known per se and the pivotal movement of the wheels during the course of this lifting movement being also controlled by means known per se, in such manner that in the "undercarriage up" position, the wheels are housed inside the fuselage in planes substantially parallel to the plane of symmetry of the aircraft, and that the structure of the landing gear occupies only the lower portion of the fuselage.

In one preferred form of construction, a control lever of the pivotal shaft of the wheels is articulated by means of a crank-arm on one extremity of a crank lever mounted so as to oscillate on the leg casing, the other extremity of the crank lever being coupled by a rigid arm to the structure of the aircraft, these various members occupying relative positions such that the swinging movement of the wheels is effected automatically during the lifting of the undercarriage, and that in the "undercarriage down" position the articulation of the control lever of the pivotal shaft on the crank-arm which couples it to the crank lever, and the articulations of the crank lever on this arm and on the leg casing are substantially in line, so as to ensure locking of the whole moving system during the course of its rotation about the pivotal shaft.

The present invention has for its object an alternative form of construction of a device of this kind, directed on the one hand to increasing the safety of locking in the "undercarriage down" position of the moving system and on the other hand, to ensure the rigidity of the whole of the undercarriage in the "undercarriage retracted" position.

To this end, the arm coupling the crank lever to the control lever of the pivotal shaft of the wheels is provided with an abutment which, in the "undercarriage down" position, comes into contact with an abutment of the corresponding part of the crank lever when the articulations of this arm and the articulation of the crank lever on the leg casing have moved slightly beyond the position of alignment, while an abutment of a pivoted element, for example of the control lever of the pivotal shaft of the wheels, and an abutment of an element of the non-pivoted structure, for example an abutment provided on the leg casing, come into contact with each other and limit the pivotal movement of the moving system slightly before the "undercarriage fully retracted" position.

An elastic arm, which can be shortened or lengthened by means of an external force corresponding to the threshold of the spring with which it is provided, is substituted for the rigid crank-arm which, in the form of embodiment of the above-mentioned patent, couples the crank-lever to the structure of the aircraft in order to maintain the corresponding abutments in contact in the "undercarriage down" position, to ensure the pivotal movement of the moving system during the lifting of the landing gear, and to stress the whole of the crank-rod system in the "undercarriage fully retracted" position.

One form of embodiment of a lifting system of this kind will be described in detail below by way of non-limitative example, reference being made to the accompanying drawings, in which:

FIGS. 1, 2 and 3 illustrate three phases of operation of the locking system according to the present invention, respectively in the "undercarriage down" position, during the course of lifting, and in the "undercarriage retracted" position.

The parts already referred to in the above-mentioned patent will not be described in detail.

A crank-lever 17, pivoted at 19 on the leg casing 8, comprises an abutment 23 which cooperates with an abutment 24 of the crank-arm 15, coupling in a manner known per se the crank-lever 17 to the lever 14 rigidly fixed to the pivotal shaft of the wheels of the landing gear (not shown). The two abutments come into contact in the "undercarriage down" position when the point 18 has moved slightly beyond the alignment of the points 16 and 19, as shown in FIG. 1.

An elastic arm 21a, comprising essentially a body 25, an end portion 26, and two washers 27 and 28, on which is supported a spring 29, couples the cranklever 17 to the structure of the aircraft.

The geometry of this crank-rod system is so chosen that, when the undercarriage is down and the abutments 23 and 24 are in contact, the washer 27 is supported against the body 25, the washer 28 being retained by the extremity of the end-piece 26. The spring 29 thus compressed tends to shorten the arm 21a which acts on the crank-lever 17 while forcibly applying the abutment 23 against the abutment 24.

In this manner, when a force coming from the ground and applied to the moving system produces a compression force in the arm 15, the slight misalignment of the point 18 with respect to the straight line 16–19 tends to increase, but this is prevented by the abutments 23 and 24, in which the reciprocal supporting force increases. When a force coming from the ground produces a tensile force in the arm 15, the points 16, 18 and 19 tend to come back into line, but as soon as this force disappears, the spring 29 brings the abutments 23 and 24 again into contact, which ensures the safety of the locking in rotation of the whole moving system, even in the case of deformation of the structure of the landing gear.

During the course of lifting the landing gear, the point of attachment 22 of the arm 21a, judiciously located with respect to the hinge 13, tends to move nearer to the point 19, which first of all causes a slackening of the spring 29 until the washer 28 comes into engagement with the crank-arm body 25 and until the end-piece 26 becomes supported against the washer 27 (see FIG. 2).

From this moment, as the threshold force of the spring is always greater than the forces applied to the crank-arm 21a by the moving system during the course of the lifting operation, the arm 21a does not shorten any more and causes a rocking movement of the crank lever 17. The abutments 23 and 24 then separate and the arm 15 acts on the lever 14 and rotates the moving system.

Shortly before the landing gear is completely retracted, an abutment 30, rigidly fixed to the lever 14, comes into contact with an abutment 31 arranged on the leg casing 8 (see FIG. 3). The crank lever 17 being thus immobilized, the point 22 comes closer to the point 20 by compressing the spring 29, when the force in the crank-arm 21a has reached the threshold force of this spring. The washer 27, still supported on the end-piece 26, leaves its support on the body 25, and the entire rod system is thus stressed by the force of the spring which increases until the landing gear has been completely retracted.

By this means, the play of the rod system and the pivot is taken-up and the landing gear as a whole remains rigidly in position fully retracted.

The locking system which has just been described is thus such that it ensures the locking for rotation of the moving system in the "undercarriage down" position, the degree of safety being the same irrespective of the direction of the rotational forces, and even in case of deformation of the structure of the landing gear.

In addition, it eliminates all play in the pivoted portion in the "undercarriage fully retracted" position, and in consequence ensures the rigidity of the whole of the retracted landing gear.

What I claim is:

1. In a fuselage undercarriage with retractable wheels arranged in Diabolo having a crank-lever oscillatably mounted on the leg casing of the undercarriage, one extremity of said crank-lever being coupled by a first crank-arm to a lever rigidly fixed to a pivotal shaft of the wheels, while the other extremity of said crank-lever is coupled by a second crank-arm to the structure of the aircraft, the improvement wherein said first crank-arm comprises a first abutment while said crank-lever comprises a second abutment, said first and second abutments coming into contact with each other in the down position of the undercarriage, when the articulations of said first crank-arm and the articulation of said crank-lever on said leg casing have passed slightly beyond their position of alignment.

2. In a fuselage undercarriage with retractable wheels arranged in Diabolo having a crank-lever oscillatably mounted on the leg casing of the undercarriage, one extremity of said crank-lever being coupled by a first crank-arm to a lever rigidly fixed to a pivotal shaft of the wheels, while the other extremity of said crank-lever is coupled by a second crank-arm to the structure of the aircraft, the improvement wherein said second crank-arm is an elastic crank-arm equipped with a spring, said second crank-arm being adapted to become shortened or lengthened under an external force which is respectively greater or less than the threshold force of said spring.

3. In a fuselage undercarriage with retractable wheels arranged in Diabolo having a crank-lever oscillatably mounted on the leg casing of the undercarrigae, one extremity of said crank-lever being coupled by a first crank-arm to a lever rigidly fixed to a pivotal shaft of the wheels, while the other extremity of said crank-lever is coupled by a second crank-arm to the structure of the aircraft, the improvement wherein said lever comprises a first abutment while said leg casing comprises a second abutment, said first and second abutments coming into contact with each other during the course of lifting said undercarriage, so as to limit the pivotal movement of the moving system.

4. The improvement as claimed in claim 2 wherein said second crank arm includes a hollow body, a displaceable end piece with a stem slidably mounted in said body and spring means between said body and stem.

5. The improvement as claimed in claim 4 comprising washers fixed on said stem, said spring means being engaged between said washers, said washers being displaceable in said hollow body between end abutment positions corresponding to threshold positions.

6. The improvement as claimed in claim 5 wherein said first crank-arm comprises a first abutment while said crank-lever comprises a second abutment, said first and second abutments coming into contact with each other in the down position of the undercarriage, when the articulation of said first crank-arm and the articulation of said crank-lever on said leg casing have passed slightly beyond their position of alignment.

7. The improvement as claimed in claim 6 wherein said lever comprises a third abutment while said leg casing comprises a fourth abutment, said third and fourth abutments coming into contact with each other during the course of lifting said undercarriage, so as to limit the pivotal movement of the moving system.

References Cited

UNITED STATES PATENTS

| | | | |
|---|---|---|---|
| 2,471,603 | 5/1949 | Bishop | 244—102 |
| 2,772,060 | 11/1956 | Bendicsen | 244—102 |
| 2,842,325 | 7/1958 | Green et al. | 244—102 |
| 2,943,819 | 7/1960 | Orloff et al. | 244—50 |
| 2,959,381 | 11/1960 | Hartel | 244—102 |
| 3,323,761 | 6/1967 | Copeland | 244—102 |

TRYGVE M. BLIX, Primary Examiner

P. E. SAUBERER, Assistant Examiner